United States Patent
Hansson et al.

(10) Patent No.: US 6,572,309 B2
(45) Date of Patent: Jun. 3, 2003

(54) KEY FOR WIDENING AN INSERT SEAT OF A HOLDER

(75) Inventors: Per Hansson, Gävle (SE); Gunnar Jansson, Sandviken (SE)

(73) Assignee: Sandvik AB, Sandviken (SE)

(*) Notice: Subject to any disclaimer, the term of this patent is extended or adjusted under 35 U.S.C. 154(b) by 0 days.

(21) Appl. No.: 09/986,188

(22) Filed: Nov. 7, 2001

(65) Prior Publication Data

US 2002/0054792 A1 May 9, 2002

(30) Foreign Application Priority Data

Nov. 7, 2000 (SE) .............................. 0004044

(51) Int. Cl.⁷ .................... B23B 25/00; B23D 15/28
(52) U.S. Cl. .................... 407/72; 407/109; 407/110
(58) Field of Search .................... 407/107, 109, 407/110, 50, 72; 76/80; 82/160

(56) References Cited

U.S. PATENT DOCUMENTS

| | | | |
|---|---|---|---|
| 383,103 A | | 5/1888 | Cook |
| 580,440 A | * | 4/1897 | White .................... 407/72 |
| 5,795,109 A | * | 8/1998 | Jonsson et al. ............. 82/160 |
| 5,799,554 A | * | 9/1998 | Friedman et al. .......... 407/107 |
| 5,803,675 A | | 9/1998 | Von Haas |
| 5,899,643 A | | 5/1999 | Oehler |
| 5,980,165 A | * | 11/1999 | Hansson et al. ........... 407/110 |
| 6,065,906 A | * | 5/2000 | Hansson .................... 407/110 |

FOREIGN PATENT DOCUMENTS

| | | |
|---|---|---|
| DE | 19814 064 | 5/1999 |
| EP | 1 022 079 | 7/2000 |
| EP | 1 072 344 | 1/2001 |
| GB | 1 379 637 | 2/1972 |
| WO | WO 95/13892 | 5/1995 |
| WO | WO 99/50012 | 10/1999 |

* cited by examiner

*Primary Examiner*—A. L. Wellington
*Assistant Examiner*—Brian D Walsh
(74) *Attorney, Agent, or Firm*—Burns, Doane, Swecker & Mathis, LLP

(57) ABSTRACT

A holder includes a seat which removably carries a cutting insert for chip removing machining. The seat can be widened by the manual application of a force to enable the insert to be replaced. The force is applied by a manually actuable key which includes a shaft and an expansion mechanism mounted on an end of the shaft. The expansion mechanism includes a plate which is mountable to the holder in a manner enabling a projection pin of the shaft to enter a slot which constitutes an extension of the insert seat. The portion of the pin entering the slot has an out-of-round cross sectional shape. By rotating the shaft relative to the plate, the pin rotates to widen the slot, and thus to widen the seat. Rotation of the shaft relative to the plate is terminated after a predetermined amount of rotation, in response to mutual engagement between stop surfaces disposed on the shaft and the plate, respectively.

15 Claims, 3 Drawing Sheets

Fig. 1
Fig. 2
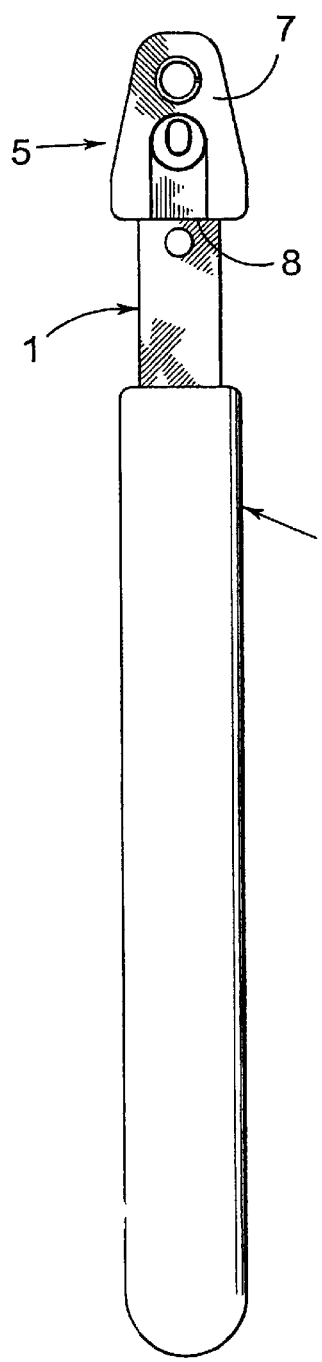
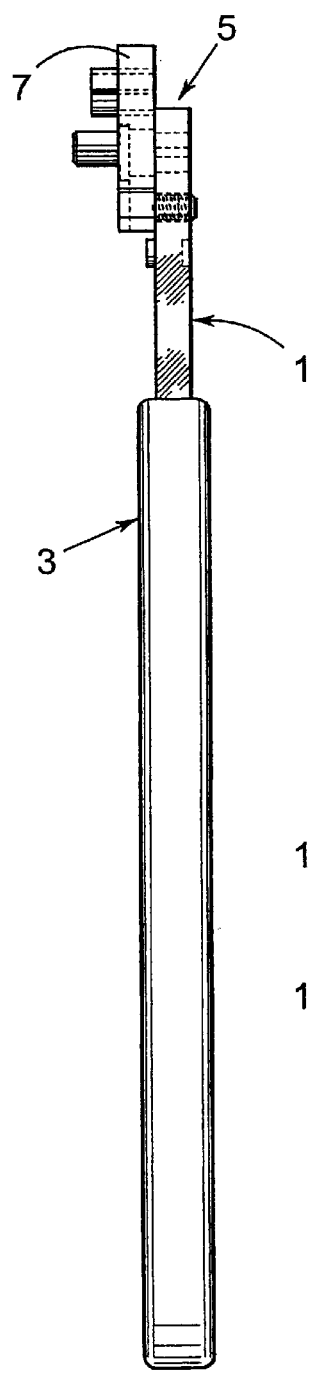
Fig. 3
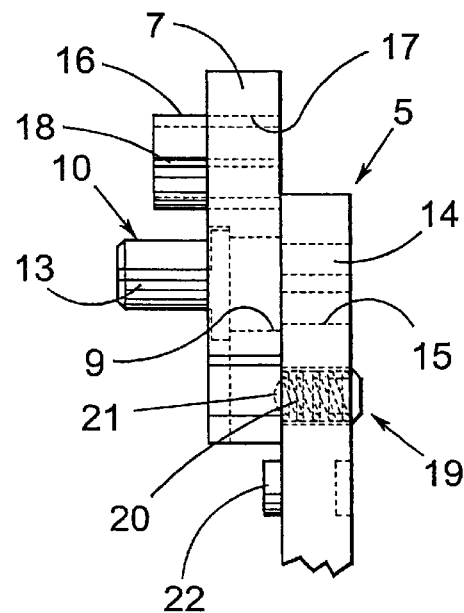

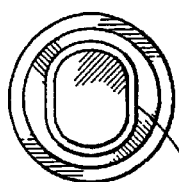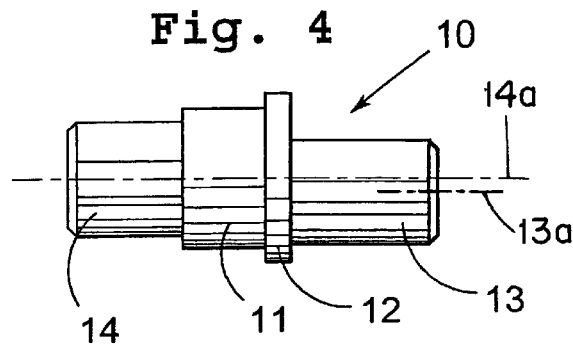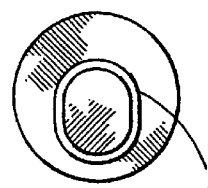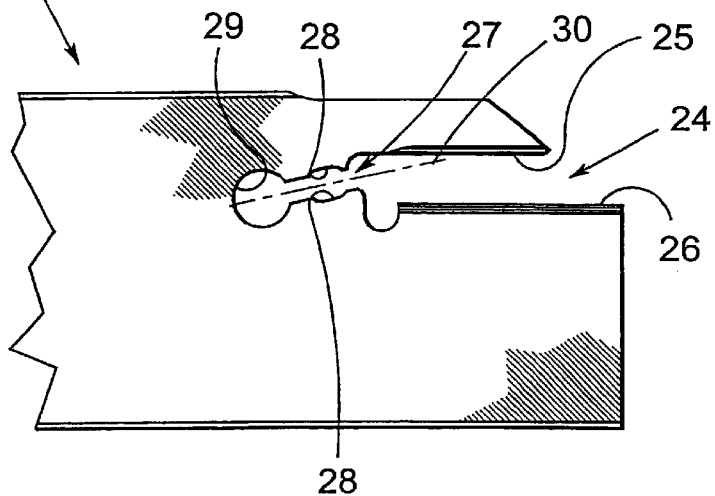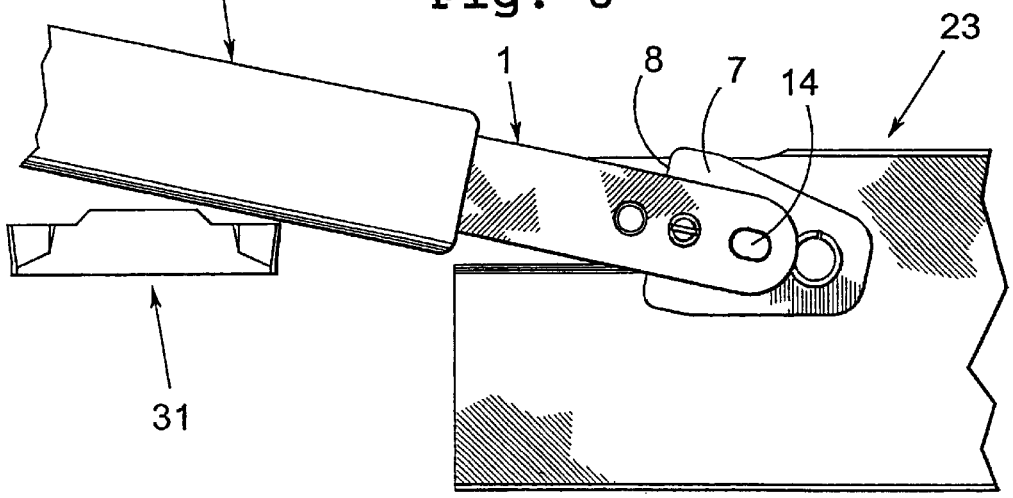

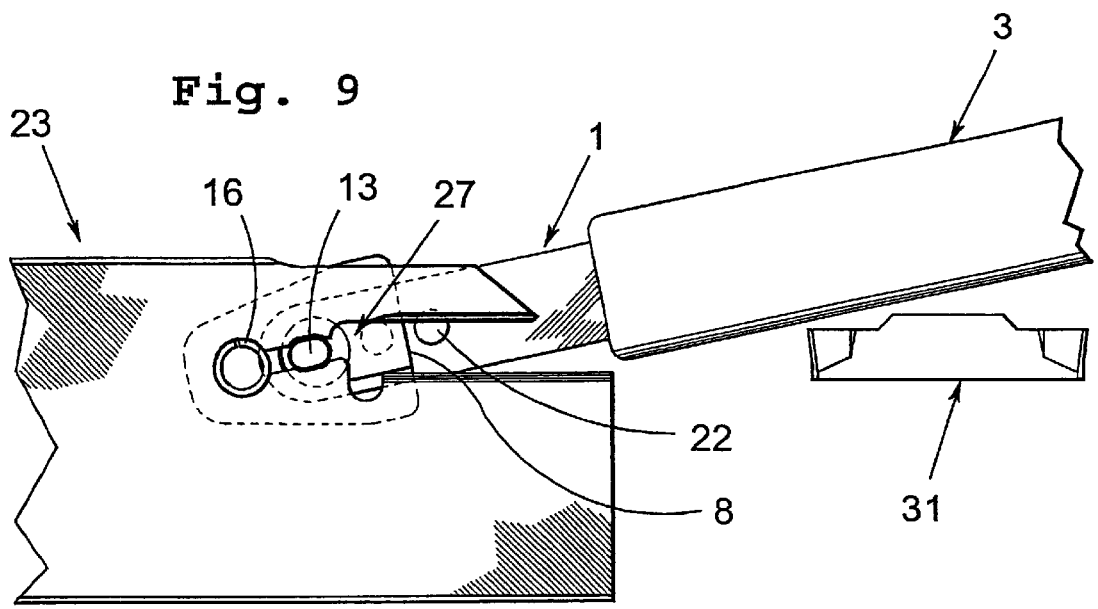
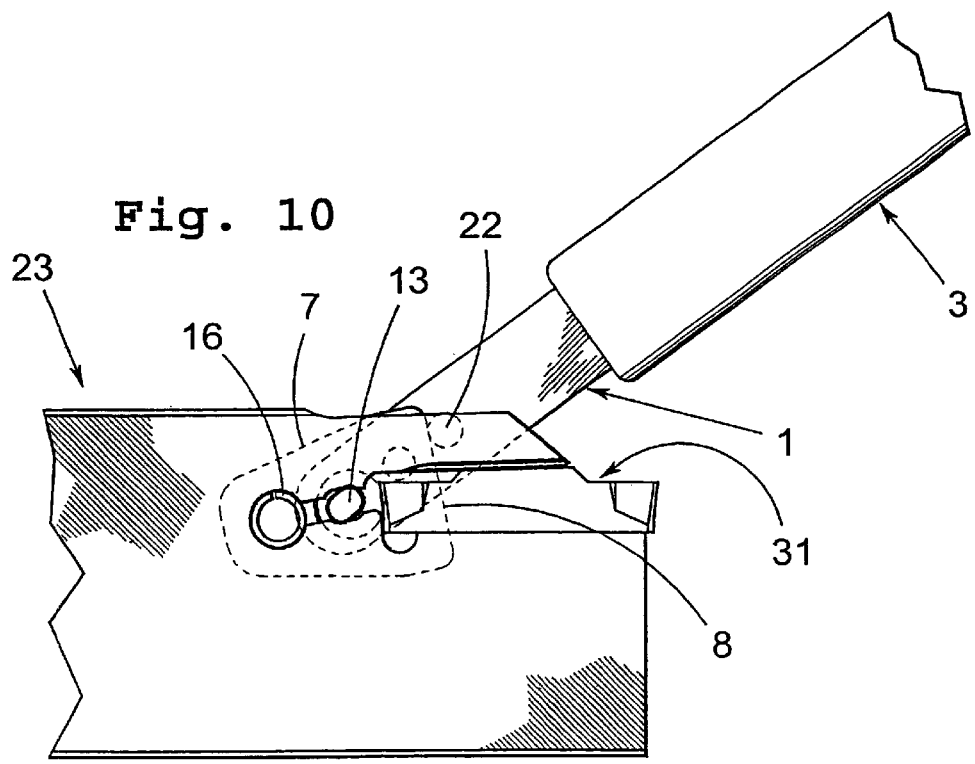

KEY FOR WIDENING AN INSERT SEAT OF A HOLDER

This application claims priority under 35 U.S.C. §§119 and/or 365 to Patent Application Serial No. 0004044-4 filed in Sweden on Nov. 7, 2000, the entire content of which is hereby incorporated by reference.

TECHNICAL FIELD OF THE INVENTION

The present invention relates to a key, which is intended to be used to widen an insert seat during mounting and dismounting of a cutting insert for chip removing machining. The key comprises a shaft as well as an expansion member arranged in the area of one end of the shaft. The expansion member comprises an expansion portion having an out-of-round cross-section, which expansion portion is fixed in the shaft. The shaft has a handle which, as seen in the longitudinal direction of the shaft, is spaced from the expansion member.

PRIOR ART

A key of the kind defined above is previously known from each of GB-PS-1 379 637 and WO 95/13892, said key having a shaft and an oval expansion part at a free end of the shaft. The oval expansion part is intended to be inserted in a slot of a holder for a cutting insert for chip removing machining, which slot has a smaller cross corner dimension than the maximum cross corner dimension of the oval expansion part. By turning the oval expansion part, the slot is widened, which in turn entails that the insert seat in the holder which houses the cutting insert is also widened, enabling a cutting insert to be mounted in, or dismounted from, the insert seat. If the key is rotated too far, the holder can become overloaded, which in turn may lead to fatigue of the material forming the holder.

A key of the kind defined above is previously known from, DE-PS-198 14 064, said key having a shaft and a generally triangular expansion part at a free end of the shaft. The expansion part is intended to co-operate with a semi-circular opening of a holder for a cutting insert for chip removing machining. The opening is dimensioned in such a way in relation to the triangular expansion part that when the expansion part is turned, the insert seat of the holder will be widened, which enables mounting or dismounting of a cutting insert. As in the case of the key design described above, the key is turned too far, there is a risk of overloading of the appurtenant holder, and thereby fatigue of material.

In WO 99/50012 there is disclosed a key which deals with the overloading problem by configuring the key with a polygonal cross-section, the maximum dimension of which equals a distance by which the walls of the insert seat should be separated for replacing an insert. However, that key presents a problem in that if the key is inadvertently rotated too far during a slot-widening step, the slot may close in an uncontrolled manner and/or the handle may rotate too far and injure the operator's hand.

AIMS AND FEATURES OF THE INVENTION

A primary aim of the present invention is to describe a key of the kind defined in the introduction, wherein the turning of the expansion portion is limited to an extent which ensures that the material in the holder is not overloaded. Thus, the tensile force of the parts which define a insert seat of the holder does not decline, i.e. that the material in these parts is not fatigued.

Another aim of the key according to the present invention is that a relatively small force is required for broadening the insert seat in connection with mounting or dismounting of a cutting insert.

At least the primary object is realized by a manually actuable key for widening an insert-receiving seat of an insert holder. The key comprises a shaft having a manual gripping portion, and an expansion mechanism mounted on the shaft at a location spaced from the gripping portion. The expansion mechanism comprises a mounting element carried by the shaft, with the shaft being rotatable relative to the mounting element about a rotary axis extending traversely of a longitudinal axis of the shaft. The mounting element includes a fixing section for mounting the key to the holder. The fixing section is situated farther from the manual gripping portion than is the rotary axis. The expansion mechanism further includes an expansion element connected to the shaft for rotation therewith relative to the mounting element. The expansion element extends through the mounting element parallel to the rotary axis and includes a projecting end portion projecting traversely from the mounting element and having an out-of-round cross sectional shape for insertion into the holder. A stop arrangement is provided for terminating rotation of the shaft following a predetermined extent of relative rotation between the shaft and the mounting element.

The present invention also relates to a method of widening an insert seat of an insert holder, the holder including a slot extending from an inner end of the seat. The method utilizes the above-described key and comprises the steps of:

A. mating the mounting section of the key with a corresponding mounting section of the holder and simultaneously causing the projecting portion of the expansion element to enter the slot of the holder.

B. rotating the shaft about the rotary axis relative to the mounting element and the holder, wherein the projecting portion of the expansion element rotates together with the shaft and widens the slot and the seat; and C. performing step B until a stop surface on the shaft abuts a stop to terminate the rotation of the shaft.

BRIEF DESCRIPTION OF THE DRAWINGS

An embodiment of a key according to the present invention will be described below, reference being made to the accompanying drawings, where:

FIG. 1 shows a side view of a key according to the present invention.

FIG. 2 shows a side view of the key according to FIG. 1.

FIG. 3 shows a detail of the expansion member of the key according to FIGS. 1 and 2.

FIG. 4 shows a side view of a pin included in the expansion member.

FIG. 5 shows an end view of an expansion portion included the pin according to FIG. 4.

FIG. 6 shows an end view of an anchoring portion included in the pin according to FIG. 4.

FIG. 7 shows a side view of a first side of one end of a leaf-shaped holder with which the key according to the present invention is intended to co-operate.

FIG. 8 shows a side view of a second side of the holder with the key in a starting position in the leaf-shaped holder according to FIG. 7.

FIG. 9 shows a side view of the first side of the holder, with the key in the starting position according to FIG. 8.

FIG. 10 shows a side view of the first side of the holder with the key in a final position in the holder.

DETAILED DESCRIPTION OF A PREFERRED EMBODIMENT OF THE INVENTION

The key according to the present invention, illustrated in FIGS. 1–3, comprises a shaft 1, a handle 3 defining a gripping portion of the shaft and extending along the major part of the shaft 1, and an expansion mechanism 5 connected to the shaft 1. The expansion mechanism is arranged at the end of the shaft 1 which is remote from the handle 3. Preferably, the handle 3 is made of a material that is convenient to grip, for instance rubber or plastic.

The expansion mechanism 5, illustrated in detail in FIG. 3, comprises a plate-shaped mounting element 7 for mounting the shaft to the holder. The element 7 includes a centrally situated first through-hole 9, in which a pin 10 is received, which is shown in detail in FIGS. 4–6. The pin 10 has an intermediate circular cylindrical portion 11, and a circular cylindrical collar 12 having a somewhat larger diameter than the circular cylindrical portion 11. Furthermore, the pin 10 comprises an expansion portion 13 projecting from the collar 12 which expansion portion has an out of round, preferably oval, cross-section, see FIG. 5. The pin 10 also comprises an anchoring portion 14 projecting from the circular cylindrical portion 11 in FIG. 4, which anchoring portion also has an out-of-round, preferably oval, cross-section, see FIG. 6. As is seen in FIG. 4, the longitudinal center axes of the expansion portion 13 and anchoring portion 14 preferably do not coincide in the embodiment illustrated. The reason for that is to save space by virtue of the design of the holder 23, which will be described below. In this connection, it should, however, be pointed out that within the scope of the invention, the longitudinal axes of the portions 13 and 14 could coincide.

The center axis of the collar 12 (which in the disclosed preferred embodiment coincides with the center axis 14a) defines a transverse axis of rotation about which the shaft can rotate relative to the mounting element 7.

The pin 10 projects through the plate-shaped element 7. In particular the circular cylindrical portion 11 and the collar 12 are rotatably received in the through-hole 9 of the plate-shaped element 7, see FIG. 3. The anchoring portion 14 is received in a second through-hole 15 formed in the shaft 1, see FIG. 3. The second through-hole 15 has an out-of-round cross-section corresponding to the out-of-round cross-section of the anchoring portion 14. Thus, no rotation between the anchoring portion 14 and the shaft 1 can take place. The anchoring portion 14 is fixed in the second hole 15 in a suitable way, for instance via press fit. Since the anchoring portion 14 has a non-circular cross section, it cannot rotate relative to the shaft 1. The function of the expansion portion 13 will be evident from the description below.

The expansion member 5 also includes a fixing section in the form of a substantially circular cylindrical sleeve part 16, which is received in a circular third through-hole 17 in the plate-shaped element 7. The sleeve part 16 is a split sleeve, i.e., it is provided with an axial slit 18, which renders the sleeve part 16 elastically flexible in the circumferential direction. Thus, the sleeve part 16 may be mounted in the third hole 17 with press fit. The sleeve part 16 is situated farther from the handle 3 than is the pin 13.

The expansion member 5 also comprises a spring-activated positioning member 19, which in turn comprises a spring-activated ball 20 which is intended to co-operate with a countersink 21 in the plate-shaped element 7. The ball 20 is spring-biased into the countersink when the key according to the present invents assumes the neutral position thereof, see FIG. 1.

To limit the extent of rotation of the plate-shaped element 7 there is provided a stop dog arranged on the shaft 1, which stop dog is in the form of a shoulder 22 protruding transversely from the shaft 1. The shoulder is situated on the side of the shaft 1 which faces the plate-shaped element 7. As is seen, for instance in FIGS. 1 and 9, the plate-shaped element 7 has an edge 8 facing the handle 3, which edge extends transversely to the longitudinal direction of the shaft. The shoulder 22 and the edge 8 define mutually cooperative stop surfaces, the function of which will be evident from the description below.

The holder 23, partly illustrated in FIG. 7, has an insert seat 24 at one end thereof. Preferably, the holder 23 has a corresponding insert seat also at the other end thereof (not shown). The insert seat 24 has a first edge 25 and a second edge 26, said edges 25, 26 being oppositely disposed, preferably parallel, and extending in the longitudinal direction of the holder 23, the intention being that a cutting insert can be received in the space between said edges 25 and 26. At inner ends of the first and second edges 25, 26, i.e. in the direction inwards towards the center of the holder 23, a slot 27 is arranged, the slot 27 having surfaces with which the key according to the present invention is intended to co-operate. That is, the slot 27 is provided with oppositely disposed cavities or expansions 28, which together with the slot 27 define a space, in which the out of round expansion portion 13 of the key fits when the expansion portion 13 is oriented in such a way that the smallest cross sectional corner dimension thereof extends between the cavities 28. Co-operation between the expansion portion 13 and the space defined by the cavities 28 and the slot 27 will be described more in detail below.

Inwards from the cavities 28, the slot 27 transforms into a circular fourth hole 29, which forms a termination of the slot 27. The fourth hole 29 has such a diameter that the sleeve part 16 fits into said hole 29 with a relatively fine tolerance, i.e. the sleeve part 16 may be inserted without problem into the fourth hole 29.

The slot 27 has such a design that the slot 27 is basically symmetrical with respect to a longitudinal center line 30 thereof.

The key according to the present invention cooperates with the holder 23 in the following way during mounting or dismounting of a cutting insert 31 in the insert seat 24. FIGS. 8 and 9, show the starting position for co-operation between the key and the holder 23. In doing so, the key is fixed in the slot 27 in such a way that the expansion portion 13 is received in the cavities 28, and the sleeve part 16 is received in the fourth hole 29.

In the starting position illustrated in FIGS. 8 and 9, the key assumes the neutral position thereof, i.e. the spring-activated ball 20 is received in the countersink 21. If a manual, upwardly directed force in FIGS. 8 and 9 is applied to the shaft 1, the shaft 1 rotates about the rotary axis 14a. Also, the pin 10 (and its expansion portion 13) rotates with the shaft 1 since the oval anchoring portion 14 cannot rotate relative to the shaft.

This rotation of the expansion portion 13 ensures, by virtue of the oval cross-sectional shape of the expansion portion 13, that the cavities 28 of the slot 27 are pressed apart, which in turn ensures that the opposite edges 25 and 26 are pressed apart. In FIG. 10, the terminal position for the rotation of the key according to the present invention is shown, i.e. the expansion portion 13 is rotated to the maximum, which rotation is limited by the fact that the stop 22 comes into abutment against the plate-shaped element 7 and more precisely against the edge 8 of the plate-shaped element which faces the handle 3. This limitation of the rotation of the expansion portion 13 ensures that the risk of overload of the material in the holder 23 in connection with the slot 27 is reduced to a significant degree, especially that the material in the "finger" which contains the first edge 25 does not reach the limit of its fatigue strength. If the limit of its fatigue strength of the material were reached, this would result in a reduction of the tensile force being applied to the cutting insert 31 of "the finger", which would have a direct negative effect on the function of the holder 23. In this connection, it should be pointed out that during rotation of the expansion portion 13, the plate-shaped element 7 is stationary in relation to the holder 23 due to the fact that the expansion portion 13 is received between the cavities 28, and the sleeve part 16 is received in the fourth hole 29. Thus, during rotation of the expansion portion 13, the shaft 1 will be displaced in relation to the plate-shaped element 7. At the beginning of said displacement the spring-activated ball 20 is pushed out of the countersink 21 in the plate-shaped element 7.

Thus, in the position illustrated in FIG. 10, the edges and 26 are pressed apart, which ensures that a cutting insert 31 can be inserted in the insert seat 24. When the cutting insert 31 has assumed the position illustrated in FIG. 10, the key is caused to return to the starting position illustrated in FIGS. 8 and 9 for co-operation between the key and the holder 23, whereupon the edges 25 and 26 again approaching each other which ensures that the cutting insert 31 is fixed in the insert seat 24. In this connection, it should be pointed out that the key always strives to return to the starting position thereof since the cavities 28 strive to approach each other, i.e. assume a neutral position without external influence. The key may now be removed by being displaced laterally in relation to the holder 23, which means that the engagement between the expansion portion 13 and the cavities 28 as well as the engagement between the sleeve part 16 and the fourth hole 29 cease.

In case the cutting insert 31 is to be removed from the insert seat 24, the procedure is such that the key and the holder 23 are brought to assume the starting position illustrated in FIGS. 8 and 9, the expansion portion 1–3 being received between the cavities 28 and the sleeve part 16 being received in the fourth hole 29. In doing so, the spring-activated ball 20 is received in the countersink 21 in the plate-shaped element 7. By applying a manual, upwardly directed force on the handle 3 of the shaft 1, the shaft 1 is brought to displacement in relation to the plate-shaped element 7 in the way which has been described above in connection with mounting of a cutting insert 31 in the insert seat 24. When the position illustrated in FIG. 10 has been attained, the cutting insert 31 positioned in the insert seat 24 can be removed and, if requested, be replaced by a new cutting insert. Then, the key is brought to return to the starting position thereof in the way that has been described above in connection with mounting of a cutting insert 31 in the insert seat 24.

FEASIBLE MODIFICATION OF THE INVENTION

In the above-described embodiment, the stop dog between the shaft 1 and the plate-shaped element 7 has the form of a shoulder 22, having a circular cross-section, affixed to the shaft 1. However, within the scope of the present invention, alternative designs of the stop dog are feasible, at which in an exemplifying and not limiting aim, it may be mentioned that the stop dog may be in the form of two straight protruding edge portions, which form a certain angle to each other, said edge portions coming to abutment against the edge 8 of the plate-shaped element 7.

Although the present invention has been described in connection with preferred embodiment thereof, it will be appreciated by those skilled in the art that additions, deletions, modifications, and substitutions not specifically described may be made without departing from the spirit and scope of the invention as defined in the appended claims.

What is claimed is:

1. A manually actuable key for widening an insert-receiving seat of an insert holder, comprising:
   a shaft having a manual gripping portion, and
   an expansion mechanism mounted on the shaft at a location spaced from the gripping portion, the expansion mechanism comprising:
      a mounting element carried by the shaft, with the shaft being rotatable relative to the mounting element about a rotary axis extending transversely of a longitudinal axis of the shaft, the mounting element including a fixing section for mounting the key to the holder, the fixing section situated farther from the manual gripping portion than is the rotary axis,
      an expansion element connected to the shaft for rotation therewith relative to the mounting element, the expansion element extending through the mounting element parallel to the rotary axis and including a projecting portion projecting transversely from the mounting element and having an out-of-round cross sectional shape for insertion into the holder, and
      a stop arrangement for terminating rotation of the shaft following a predetermined extent of relative rotation between the shaft and the mounting element.

2. The key according to claim 1 wherein the stop arrangement comprises mutually engageable stops on the mounting element and the shaft, respectively.

3. The key according to claim 2 wherein one of the stops is defined by a surface of the mounting element which faces away from the rotary axis, and another of the stops is defined by a shoulder protruding transversely from the shaft.

4. The key according to claim 1 wherein the expansion element includes a cylindrical collar defining the rotary axis and upon which the mounting element is rotatably mounted.

5. The key according to claim 4 wherein the mounting section comprises a cylindrical sleeve projecting transversely from the mounting element in a direction parallel to the rotary axis.

6. The key according to claim 5 wherein the cylindrical sleeve includes a slit extending therethrough parallel to the rotary axis, wherein the cylindrical member is circumferentially elastically compressible.

7. The key according to claim 4 wherein the expansion number further includes an inner portion of out-of-round cross-section mounted in the shaft.

8. The key according to claim 7 wherein a center axis of the outer portion is parallel to and spaced from the rotary axis.

9. The key according to claim 1 wherein the mounting element comprises a plate lying in a plane oriented parallel to a plane of the shaft.

10. The key according to claim 1 further including a positioning member releasably retaining the shaft and the mounting element in a predetermined rotational relationship by frictional forces.

11. The key according to claim 10 wherein the positioning member comprises a spring-biased ball carried by the shaft and engageable in a countersink of the mounting element when the shaft and the mounting element are in the predetermined relationship.

12. The key according to claim 1 wherein the mounting section comprises a cylindrical sleeve projecting transversely from the mounting element in a direction parallel to the rotary axis.

13. The key according to claim 1 wherein expansion member further includes an inner portion of out-of-round cross-section mounted in the shaft.

14. The key according to claim 13 wherein a center axis of the outer portion is parallel to and spaced from the rotary axis.

15. A method of widening an insert seat of an insert holder, the holder including a slot extending from an inner end of the seat, the method utilizing a key comprising a shaft having a manual gripping portion, and an expansion mechanism mounted on the shaft at a location spaced from the gripping portion, the expansion member comprising a mounting element carried by the shaft, with the shaft being rotatable relative to the mounting element about a rotary axis extending transversely of a longitudinal axis of the shaft, the mounting element including a fixing section situated farther from the manual gripping portion than is the rotary axis, an expansion element connected to the shaft for rotation therewith relative to the mounting element, the expansion element extending through the mounting element parallel to the rotary axis and including a projecting portion projecting traversely from the mounting element and having an out-of-round cross sectional shape, the method comprising the steps of:

A. mating the mounting section of the key with a corresponding mounting section of the holder and simultaneously causing the projecting portion of the expansion element to enter the slot of the holder;

B. rotating the shaft about the rotary axis relative to the mounting element and the holder, wherein the projecting portion of the expansion element rotates together with the shaft and widens the slot and the seat; and C. performing step B until the shaft abuts a stop, to terminate the rotation of the shaft.

* * * * *